United States Patent
Sinha et al.

(10) Patent No.: US 11,599,895 B2
(45) Date of Patent: Mar. 7, 2023

(54) GROSS MARGIN RECOVERY WITH SUPERVISED MACHINE LEARNING TECHNIQUE

(71) Applicant: Dell Products L.P., Round Rock, TX (US)

(72) Inventors: Moloy Kumar Sinha, Bangalore (IN); Rajkumar Dan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 151 days.

(21) Appl. No.: 16/514,259

(22) Filed: Jul. 17, 2019

(65) Prior Publication Data

US 2021/0019772 A1  Jan. 21, 2021

(51) Int. Cl.
| | |
|---|---|
| *G06Q 10/06* | (2012.01) |
| *G06Q 30/02* | (2012.01) |
| *G06Q 30/0202* | (2023.01) |
| *G06N 20/00* | (2019.01) |
| *G06Q 10/04* | (2023.01) |

(52) U.S. Cl.
CPC ......... *G06Q 30/0202* (2013.01); *G06N 20/00* (2019.01); *G06Q 10/04* (2013.01)

(58) Field of Classification Search
CPC ............................. G06Q 10/06; G06Q 30/02

USPC ........................................................ 705/7.31
See application file for complete search history.

(56) References Cited

U.S. PATENT DOCUMENTS

| | | | | |
|---|---|---|---|---|
| 7,908,164 | B1* | 3/2011 | Verma | G06Q 30/0206 705/7.35 |
| 2012/0253995 | A1* | 10/2012 | Boob | G06Q 10/067 705/28 |
| 2013/0066740 | A1* | 3/2013 | Ouimet | G06Q 30/02 705/26.7 |
| 2014/0074752 | A1* | 3/2014 | Ouimet | G06Q 40/06 705/36 R |
| 2016/0189175 | A1* | 6/2016 | Li | G06Q 50/06 705/7.31 |
| 2019/0156357 | A1* | 5/2019 | Palinginis | G06F 17/18 |

\* cited by examiner

*Primary Examiner* — Nga B Nguyen
(74) *Attorney, Agent, or Firm* — Terrile, Cannatti & Chambers; Stephen A. Terrile

(57) ABSTRACT

A mechanism is provided to proactively forecast gross margin for a business unit of an organization utilizing machine learning techniques. Embodiments provide a cascading-architecture machine-learning model to predict gross margin for a period (e.g., an upcoming quarter), utilizing metrics both internal and external to the organization. Internal metrics can include list price change, discounting change, cost impact, and the like. External metrics can include customer information such as propensity to purchase and purchase consumption.

20 Claims, 8 Drawing Sheets

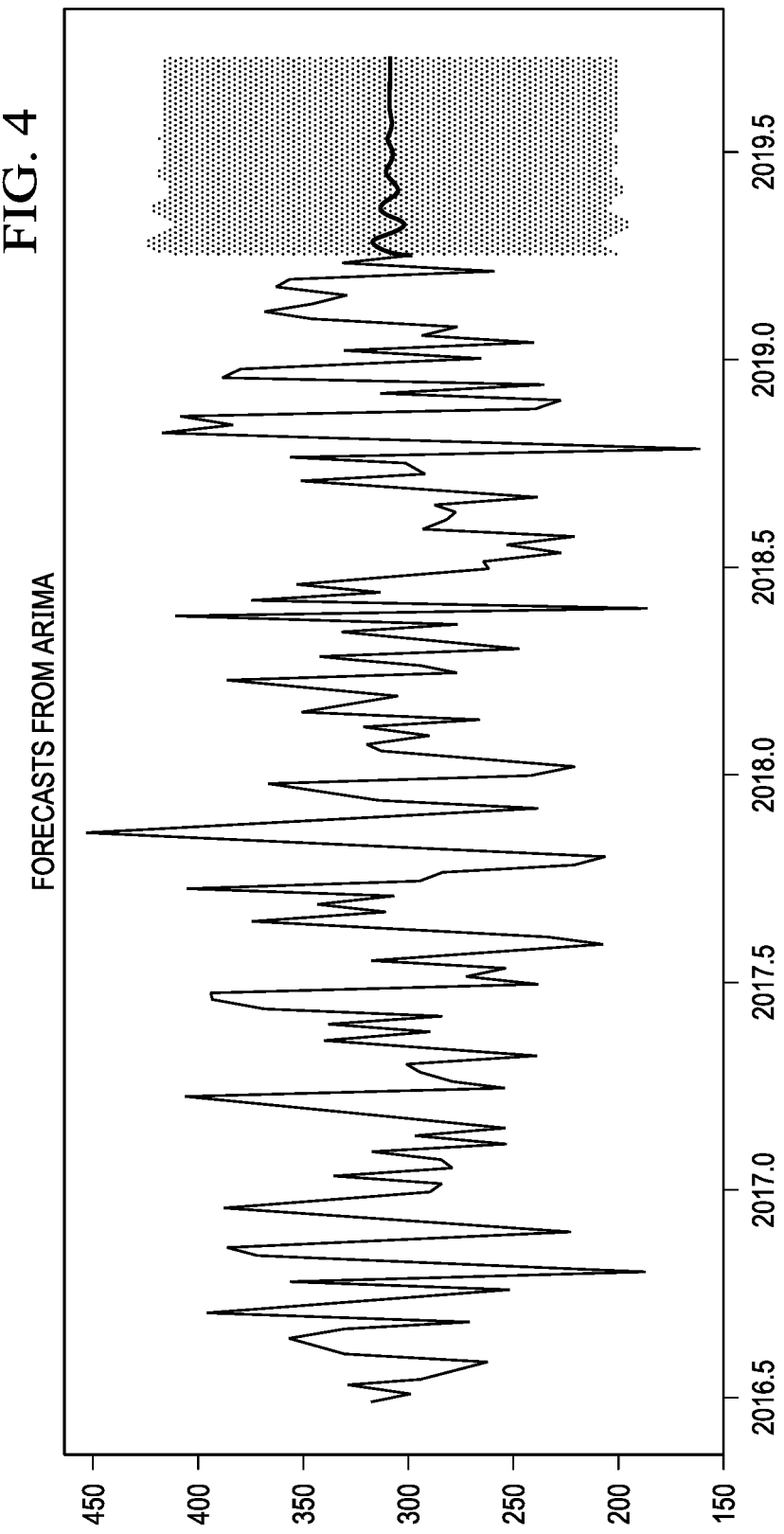

GROSS MARGIN RECOVERY WITH SUPERVISED MACHINE LEARNING TECHNIQUE

BACKGROUND OF THE INVENTION

Field of the Invention

The present invention relates to information handling systems. More specifically, embodiments of the invention relate to a machine learning technique using both internal and external parameters to accurately predict gross margin.

Description of the Related Art

As value and use of information continues to increase, individuals and businesses seek additional ways to process and store information. An information handling system generally processes, compiles, stores, or communicates information or data for business, personal, or other purposes, thereby allowing users to take advantage of the value of the information. Because technology and information handling needs and requirements vary between different users or applications, information handling systems may also vary in what information is handled, how the information is handled, how much and how quickly information is processed, stored, or communicated. Information handling systems can be general purpose or configured for a specific user or specific use such as financial transaction processing, airline reservations, enterprise data storage, or global communications. In addition, information handling systems may include a variety of hardware and software components configured to process, store, and communicate information and may include one or more computer systems, data storage systems, and networking systems.

Increasing profitability and attaining profitability targets are key priorities and challenges for business organizations. An Annual Operating Plan (AOP) for an organization provides financial targets (e.g., revenue, units, and gross margin) that are desired to be achieved by various business units within the organization. Price planning is performed periodically (e.g., quarterly) to aid in having the organization's gross margin align with the AOP. Business information related to AOP and gross margin is collected by business organizations on a daily basis, and stored in one or more information handling systems.

If there are delays or inaccuracies in adjusting price or other key performance indicators, an organization can have difficulty in attaining AOP targets, which can affect overall business performance and profitability. It is therefore desirable for a business to have an accurate analytical solution to proactively forecast gross margin on a quarterly basis and to have recommendations of how to boost profitability. The business information collected by the organization can be used to implement the analytical solution.

SUMMARY OF THE INVENTION

A system, method, and computer-readable medium are disclosed for generating a predicted gross margin for an organization. One embodiment provides a computer-implemented method that includes generating an internal factors gross margin prediction using one or more product attributes, generating an external factors gross margin prediction using one or more customer attributes and customer sales pipeline information, and generating the predicted gross margin for the organization using the internal factors gross margin prediction and the external factors gross margin prediction.

In one aspect of the above embodiment, the one or more product attributes include one or more of average list prices per unit, average cost per unit, average discount per unit, run rate revenue, and routes to market revenue. In another aspect, generating the internal factors gross margin prediction further includes forecasting demand for one or more products using one or more forecast models. In a further aspect, generating the internal factors gross margin prediction further includes using a linear regression model to combine information from the one or more forecast models and the one or more product attributes. In another further aspect, the one or more forecast models include one or more of an autoregressive integrated moving average model, a triple exponential smoothing model, and an additive model including a saturation growth model and a piecewise linear model. In a still further aspect, using the one or more forecast models includes selecting a best fit forecast model for recent demand data.

In another aspect of the above embodiment, the one or more customer attributes include one or more of forecast frequency associated with a customer account, last purchase time associated with the customer account, buying power associated with the customer account, and share of wallet associated with the customer account. In yet another aspect, generating the external factors gross margin prediction using one or more customer attributes and customer sales pipeline information further includes generating a propensity score for a selected customer account, calculating a customer account gross margin for a set period if the propensity score is greater than a gross margin threshold, adjusting the propensity score in light of the customer sales pipeline information associated with the selected customer account if the propensity score is less than the gross margin threshold, and calculating the customer account gross margin for the set period if the adjusted propensity score is greater than the gross margin threshold. In a further aspect, generating the propensity score includes using a logistic regression model on the customer attributes for the selected customer account. In still a further aspect, adjusting the propensity score includes rejecting the customer account for gross margin determination if one of no pipeline exists for the customer account or a pipeline probability associated with the pipeline sales information is less than a first threshold, and adjusting the propensity score by a first amount if the pipeline sales information is greater than the first threshold. In yet another further aspect, adjusting the propensity score further includes adjusting the propensity score by a second amount if the pipeline sales information is greater than a second threshold where the second threshold is greater than the first threshold and the second amount is greater than the first amount, and adjusting the propensity score by a third amount if the pipeline sales information is greater than a third threshold where the third threshold is greater than the second threshold and the third amount is greater than the second amount.

Another embodiment provides a system that includes a processor, a data bus coupled to the processor, and a non-transitory, computer-readable storage medium coupled to the data bus and storing computer code that interacts with a plurality of computer operations and includes instructions executable by the processor. The processor is then configured to generate an internal factors gross margin prediction using one or more product attributes, generate an external factors gross margin prediction using one or more customer attributes and customer sales pipeline information, and generate the predicted gross margin for the organization using the internal factors gross margin prediction and the external factors gross margin prediction.

In one aspect of the above embodiment, the processor is configured to generate the internal factors gross margin prediction by being further configured to forecast demand for one or more products using one or more forecast models. In a further aspect, the processor is configured to generate the internal factors gross margin prediction by being further configured to use a linear regression model to combine information from the one or more forecast models and the one or more product attributes. In another further aspect, the one or more forecast models include one or more of an autoregressive integrated moving average model, a triple exponential smoothing model, and an additive model including a saturation growth model and a piecewise linear model. In still another further aspect, the processor is configured to use the one or more forecast models by being further configured to select a best fit forecast model for recent demand data.

In another aspect of the above embodiment, the processor is configured to generate the external factors gross margin prediction using one or more customer attributes and customer sales pipeline information by being further configured to generate a propensity score for a selected customer account, calculate a customer account gross margin for a set period if the propensity score is greater than a gross margin threshold, adjust the propensity score in light of the customer sales pipeline information associated with the selected customer account if the propensity score is less than the gross margin threshold, and calculate the customer account gross margin for the set period if the adjusted propensity score is greater than the gross margin threshold. In a further aspect, the processor is configured to generate the propensity score by being further configured to use a logistic regression model on the customer attributes for the selected customer account. In a still further aspect, the processor is configured to adjust the propensity score by being further configured to reject the customer account for gross margin determination if one of no pipeline exists for the customer account or a pipeline probability associated with the pipeline sales information is less than a first threshold, and adjust the propensity score by a first amount if the pipeline sales information is greater than a first threshold.

Another embodiment provides a non-transitory, computer-readable storage medium embodying computer program code, where the computer program code includes computer executable instructions configured to generate an internal factors gross margin prediction using one or more product attributes, generating an external factors gross margin prediction using one or more customer attributes and customer sales pipeline information, and generating the predicted gross margin for the organization using the internal factors gross margin prediction and the external factors gross margin prediction.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 is a graph providing an example of output from a ARIMA model for a sample set of three years of demand data.

DETAILED DESCRIPTION

A system, method, and computer-readable medium provide a mechanism to proactively forecast gross margin for a business unit of an organization utilizing machine learning techniques. Embodiments provide a cascading-architecture machine-learning model to predict gross margin for a period (e.g., an upcoming quarter), utilizing metrics both internal and external to the organization. Internal metrics can include list price change, discounting change, cost impact, and the like. External metrics can include customer information such as propensity to purchase and purchase consumption.

Corporate Annual Operating Plans (AOP) are targets provided by an organization's leadership team that are generally in line with a growth strategy. Gross margin is typically an important contributor to successful attainment of AOP. Business units within the organization can develop periodic price plans to help align performance of the business unit with the AOP. But often price plan adjustments are performed reactively and therefore introduce a gap between adjustment to factors contributing to gross margin and alignment with the AOP. Having a predictive analytical solution that can accurately forecast an immediate next quarter's gross margin and provide data related to parameters that can influence gross margin can help to improve overall corporate performance.

Figure 1:
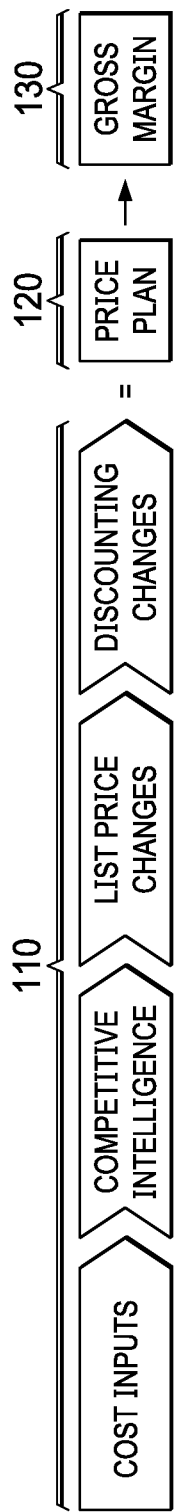
FIG. 1 is a simplified block diagram illustrating a typical set of parameters used in designing price planning by an organization.

FIG. 1 is a simplified block diagram illustrating a typical set of parameters used in designing price planning by an organization. Input parameters 110 include internal corporate data such as cost inputs, competitive intelligence related to product lines, list price changes to products, and changes made to discounting of those products. These parameters are used to determine a price plan 120 which ultimately influences gross margin 130. Price plan input parameters 110 typically do not include external factors such as customer buying behavior and expected demand. Further analysis of the input parameters to generate price plan 120 typically does not utilize rigorous statistical techniques. As a result, price planning as generated by historic methods results in gaps between how much gross margin should be generated to meet the AOP versus actual attainment (e.g., how much gross margin was actually made).

In order to provide a more accurate prediction of gross margin, embodiments of the present invention incorporate additional input parameters related to data that is external to the corporation. These additional parameters are incorporated with the traditionally used internal parameters through the use of a machine learning solution, such as a cascading architecture, as will be discussed more fully below. Gross margin then can be represented as a function of these various parameters:

Gross Margin=$f$(Internal Parameters, External Parameters)

"Internal Parameters" can include, for example, List Price Revenue/Unit, Discount/Unit, Total Cost/Unit, Run Rate Revenue, and Routes to Market Revenue. "External Parameters" can include, for example, customer-related information such as Purchase Frequency, Last Purchase Time (Recency), Buying Power, and Share of Wallet.

Figure 2:
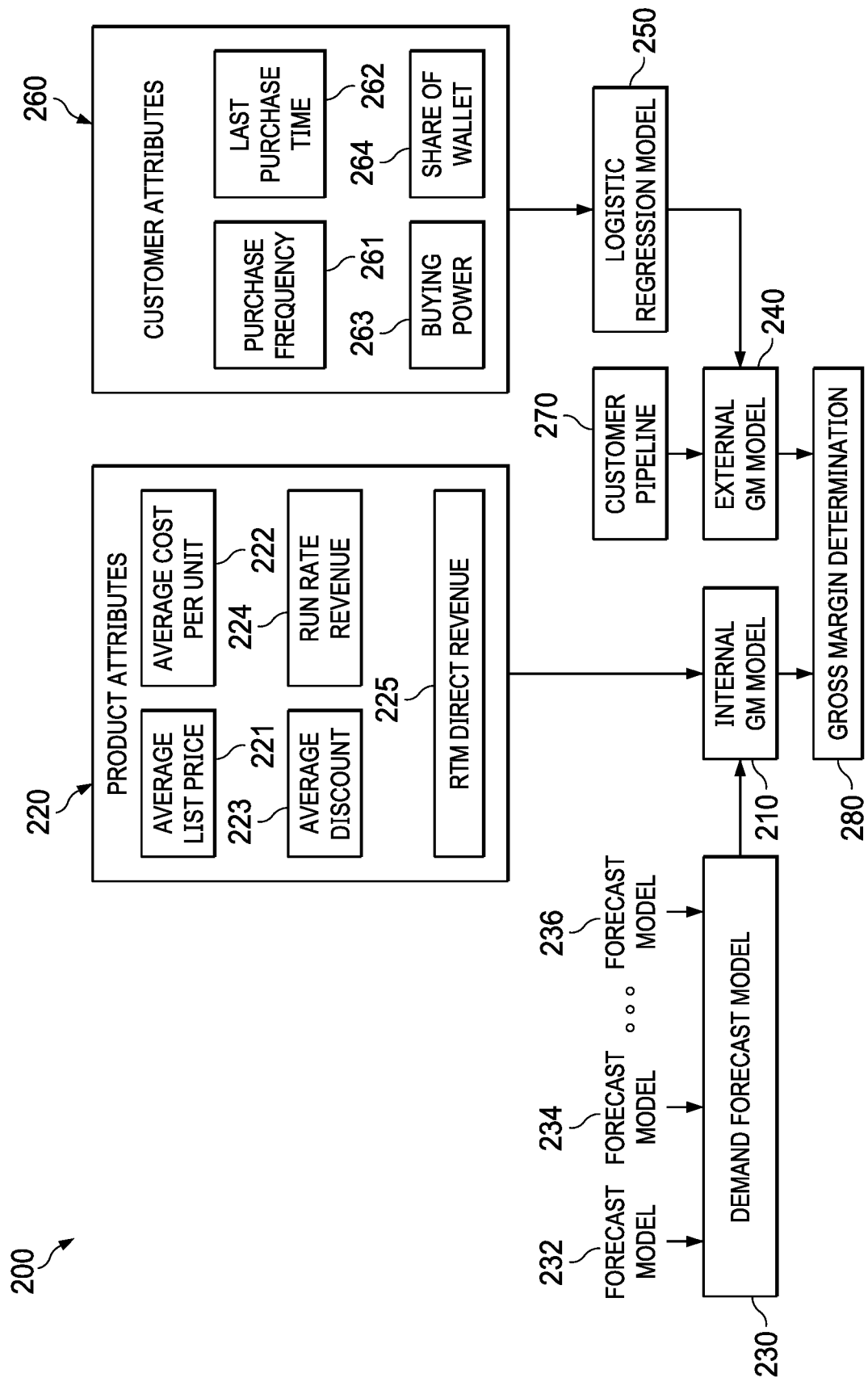
FIG. 2 is a simplified block diagram illustrating one example of a predictive gross margin architecture providing a predictive gross margin model, in accord with embodiments of the present invention.

FIG. 2 is a simplified block diagram illustrating one example of a predictive gross margin architecture 200 providing a predictive gross margin model, in accord with embodiments of the present invention. The cascading architecture illustrated in FIG. 2 provides outputs of models at one stage to inputs of models at a next stage. As illustrated, an internal factors gross margin model 210 receives, as inputs, information related to product attributes 220, as discussed above, along with information related to demand forecast provided by forecasting models 230. An external factors gross margin model 240 is also provided, which receives, as inputs, data from a logistic regression model 250 that considers a variety of customer attribute information 260 along with customer pipeline data 270. Information generated by the models for internal factors gross margin 210 and external factors gross margin 240 is used for an overall gross margin determination 280. Each of these stages will be discussed in more detail below.

Predictive gross margin architecture 200 utilizes demand forecasting models to aid in more accurately determining the number of units likely to be sold in a next quarter. Demand forecast model 230 combines results of several forecast models 232, 234, and 236. Since no one demand forecast model provides accurate information in all instances, multiple demand forecast models are used and the results are combined to reflect the best outcome for a given scenario.

Figure 3:
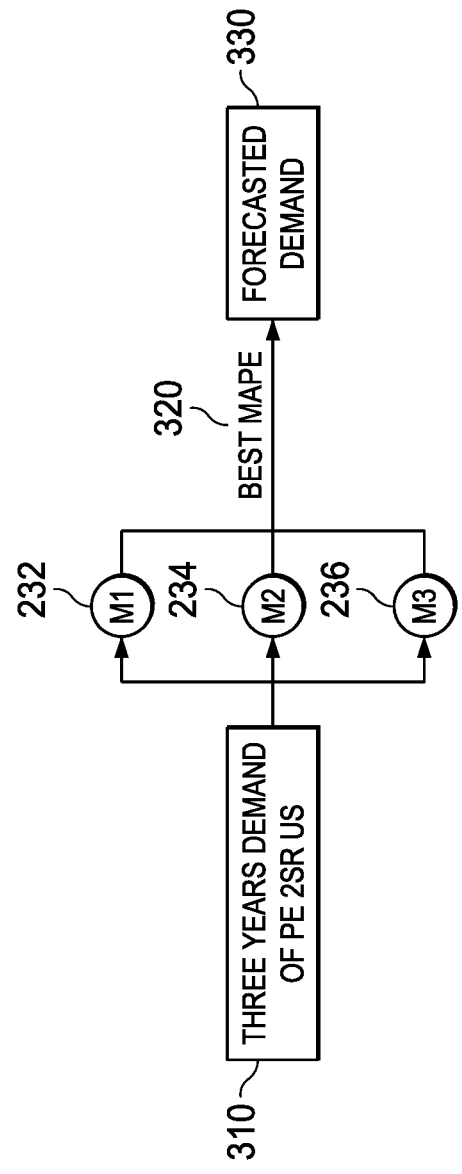
FIG. 3 is a simplified block diagram illustrating a multilayer forecasting methodology utilized to provide a demand forecast model, in accord with embodiments of the present invention.

FIG. 3 is a simplified block diagram illustrating a multi-layer forecasting methodology utilized to provide demand forecast model 230, in accord with embodiments of the present invention. In order to properly train the models used to generate forecasted demand, three years of product demand data 310 are provided to forecast models 232, 234, and 236 in order to determine which model generates a best mean average percent error (MAPE) 320. The best performing model for the training dataset is then used to provide forecasted demand 330 to internal gross margin model 210. While embodiments of the present invention are not limited to any particular forecast models, one example of a set of forecast models is ARIMA, Holt Winters, and Prophet.

ARIMA is an autoregressive integrated moving average model. Such a model is fitted to timeseries data in order to predict future points in the series. An evolving variable of interest is regressed on its own prior values. The regression error is a linear combination of error terms whose values occurred contemporaneously and at various times in the past. The data values are replaced with a difference between their values and the previous values. Each of these features is provided to make the model fit the data as well as possible. An ARIMA model usable in association with embodiments of the present invention is given by the following equation:

$$\left(1 - \sum_{i=1}^{p} \varphi_i L^i\right)(1-L)^d X_t = \left(1 + \sum_{i=1}^{q} \theta_i L^i\right)\varepsilon_t$$

Where L is a lag operator, $\theta_i$ are parameters of the moving average part, $\varepsilon_t$ are error terms, and $\varphi_i$ are parameters associated with the autoregressive part of the model.

FIG. 4 is a graph 400 providing an example of output from the ARIMA model for a sample set of three years of demand data. As the model progresses forward (e.g., past the first quarter of 2019), the forecast flattens due to output dampening in the model. An evaluation of the output from the ARIMA model using the sample set is provided in the following table.

| ARIMA Test Data Forecast | |
|---|---|
| Q2 MAPE | 3.9% |
| Weekly MAPE | 14% |
| Minimum Variance | −6% |
| Maximum Variance | 85% |

Even though the quarterly mean average percent error (MAPE) is below 4%, the minimum and maximum variances fluctuate significantly and the weekly MAPE is high at 14%. This suggests that the ARIMA model output includes an unacceptable amount of noise and there is a need for a better model that provides not only a good quarterly MAPE, but also less volatility at a granular level.

Another forecast model used is a triple exponential smoothing model, such as Holt-Winters, which is designed for use with seasonal series data. Data exhibits a season length and a seasonal component that changes during the season length. In addition, level and trend components are also modeled and smoothed. The equations governing the triple exponential smoothing model are as follows:

$$\hat{y}_{t+h|t} = \ell_t + hb_t + s_{t+h-m(k+1)}$$

$$\ell_t = \alpha(y_t - s_{t-m}) + (1-\alpha)(l_{t-1} + b_{t-1})$$

$$b_t = \beta^*(\ell_t - l_{t-1}) + (1-\beta^*)b_{t-1}$$

$$s_t = \gamma(y_t - l_{t-1} - b_{t-1}) + (1-\gamma)s_{t-m},$$

In the above equations, l is the level equation, b is the trend equation, s is the seasonal equation, and y is the forecast equation. $\alpha$, $\beta$, and $\gamma$ are smoothing factors for each of the level, trend, and seasonal models, respectively.

Figure 5:
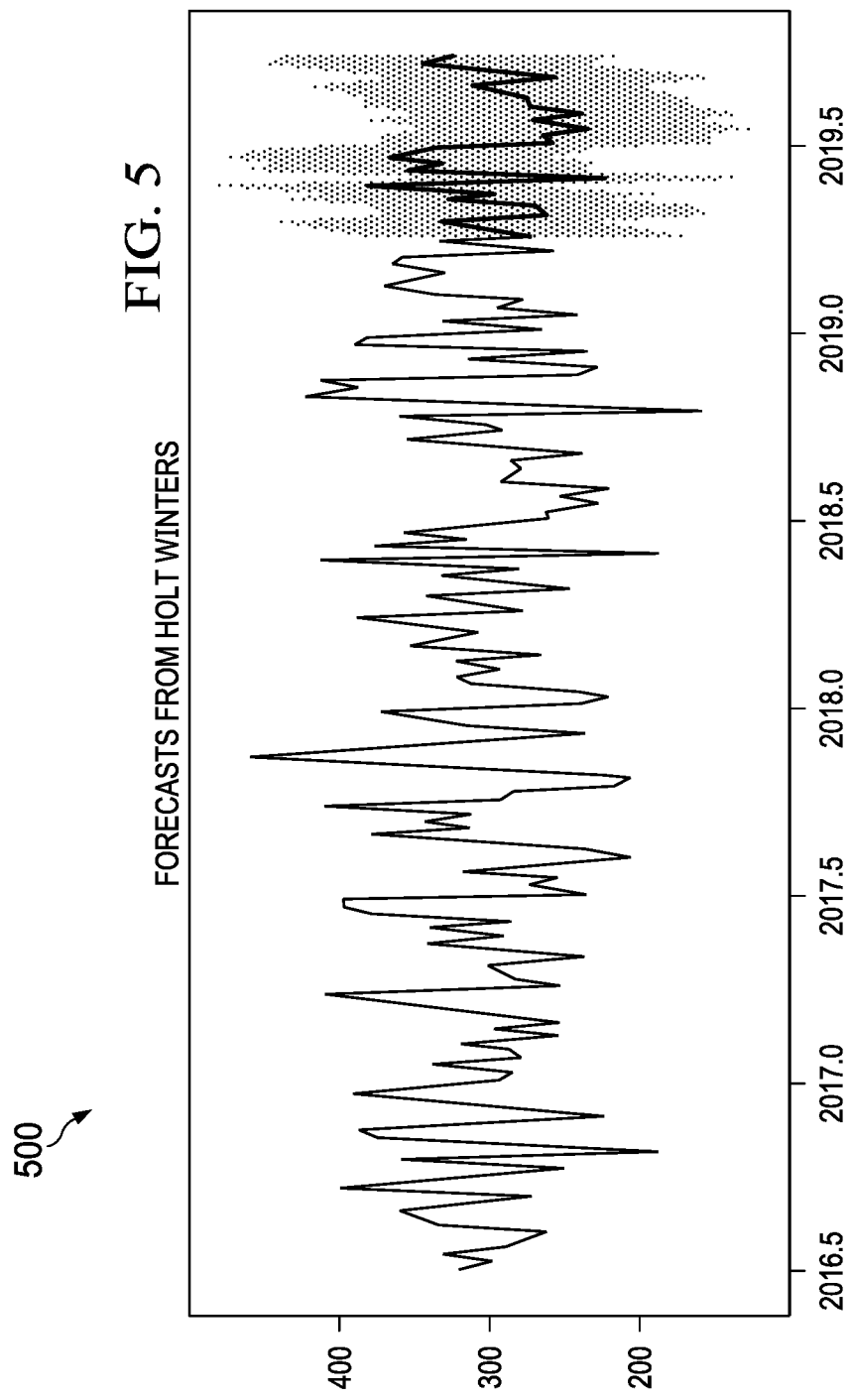
FIG. 5 is a graph providing an example of output from a Holt-Winters model for the sample set of three years of demand data.

FIG. 5 is a graph 500 providing an example of output from the Holt-Winters model for the sample set of three years of demand data. As the model progresses forward (e.g., past the first quarter of 2019), the forecast appears to perform better than ARIMA and is in-line with actuals. An evaluation of the output from the Holt-Winters model using the sample set is provided in the following table.

| Holt-Winters Test Data Forecast | |
|---|---|
| Q2 MAPE | 4.7% |
| Weekly MAPE | 7% |

-continued

| Holt-Winters Test Data Forecast | |
|---|---|
| Minimum Variance | −15% |
| Maximum Variance | 55% |

Holt-Winters provides a good MAPE at both the quarterly level and at a granular (weekly) level, but the minimum and maximum variances are still high. While the variances are less than ARIMA, it is preferable for a model to provide lower variances A third forecast model used in conjunction with the present methodology is called Prophet, which, like Holt-Winters, is an additive model that takes into consideration trend and seasonality, along with large events that can affect a business time series and an irreducible error. Prophet incorporates two trend models: a saturating growth model and a piecewise linear model, depending on the type of forecasting problem. Seasonality is modeled with a Fourier series that describes how the data is affected by seasonal factors such as time of year. Prophet also introduces an ability to flag issues that warrant manual intervention by an analyst to make better use of human and machine automated tasks.

Figure 6:
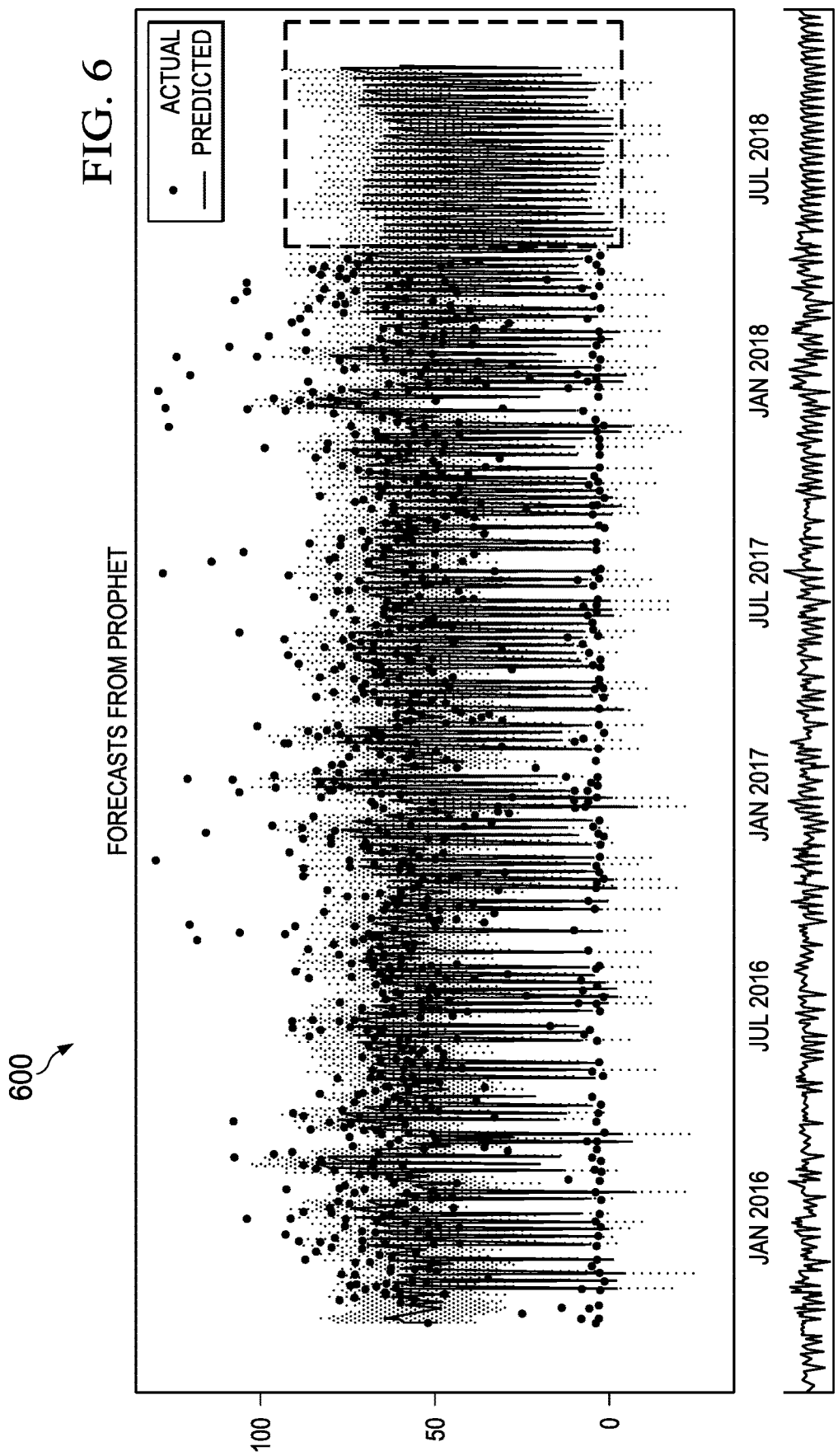
FIG. 6 is a graph providing an example of output from a Prophet model for the sample set of three years of demand data.

FIG. 6 is a graph 600 providing an example of output from the Prophet model for the sample set of three years of demand data. As the model progresses forward past the first quarter of 2019, the forecast performs better than ARIMA or Holt-Winters. An evaluation of the output from Prophet using the sample set is provided in the following table.

| Prophet Test Data Forecast | |
|---|---|
| Q2 MAPE | 3.5% |
| Weekly MAPE | −2% |
| Minimum Variance | −13% |
| Maximum Variance | 12% |

Prophet provides good MAPE at the quarterly level with a minimum and maximum variance of about ±12%, which is significantly better than either ARIMA or Holt-Winters.

Although Prophet may have provided the best results for the sample data set, Prophet may not be the best model for every application or set of data. Thus, as illustrated in FIGS. 2 and 3, results from all three demand models are used as inputs to demand forecast modeling stage 230 and the best model output is selected for input to internal gross margin model 210. It should be understood that while the above three demand forecast models are discussed by way of example, embodiments of the present invention are not limited to the use of these particular models or to just three models.

Once an accurate demand forecast has been achieved, the demand forecast is provided as one of the inputs to a regression model for predicting gross margin (e.g., internal factors gross margin model 210). In addition to the forecasted demand, product attributes 220 are also used as inputs to the internal factors gross margin regression model. Product attributes 220 can include, for example, average list price of products 221, average cost per unit 222, average discount percent of products 223, run rate revenue proportion 224, and routes-to-market direct revenue proportion 225. While other internal parameters can be provided to the internal gross margin linear regression model, it has been found that this set of product attributes has the most significant impact on determining a desired gross margin percentage.

An evaluation of the output from internal gross margin model 210 using the sample set discussed above is provided in the following table.

| Linear Regression Results | |
|---|---|
| Overall MAPE | 8.3% |
| Minimum Variance | −1.9% |
| Maximum Variance | 2.1% |
| Min Max Accuracy | 0.93 |
| Adjusted R Square | 0.86 |

In light of the adjusted root mean square error of 0.86 and the min/max accuracy of 0.93, where a value closer to one reflects the model being better, the model accuracy is statistically significant.

But the inventors of the present disclosure have found that in spite of the accuracy of the above results, the overall concept for determining gross margin is incomplete without consideration of customer account information such as a propensity to purchase. Gross margin percentage is sensitive to those customers that are likely to buy products in a next quarter. For example, if a particular customer account usually has aggressive purchasing consumption, and that customer decides not to make a purchase, then gross margin can be affected. Thus, an improvement in gross margin prediction can be made by developing a model that takes into account accurately identified accounts having a greater likelihood to buy in the next quarter.

As illustrated in FIG. 2, overall gross margin determination 280 takes into account not only the internal factors gross margin model 210 discussed above, but also an external factors gross margin model 240. The external factors gross margin model takes as an input the results of a logistic regression model 250 that analyzes customer attributes 260. In addition, external gross margin model 240 takes as an input customer pipeline information 270, which will be discussed in greater detail below.

Figure 7:
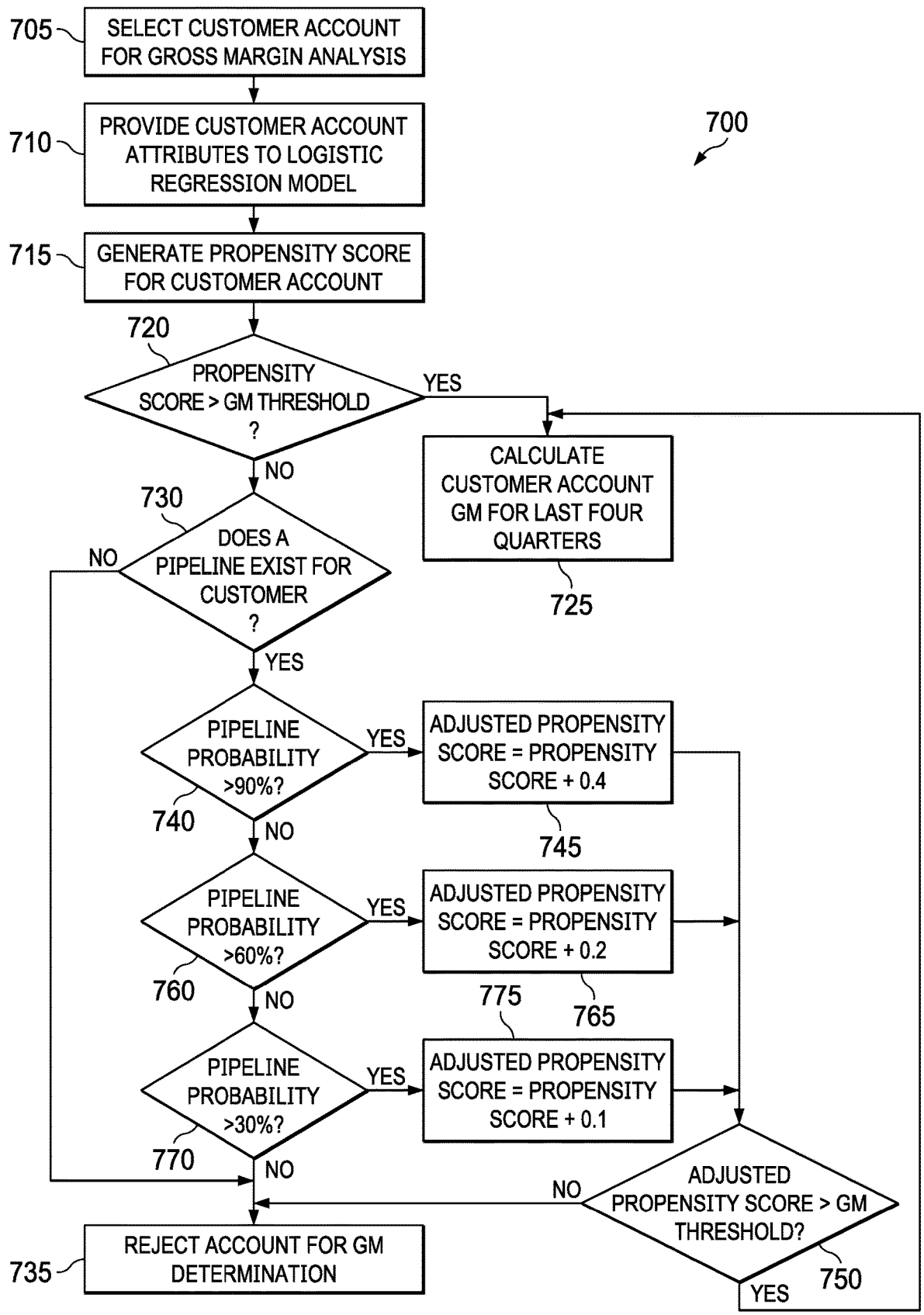
FIG. 7 is a simplified flow diagram illustrating details of an external factors gross margin model, in accord with embodiments of the present invention.

FIG. 7 is a simplified flow diagram illustrating details of external factors gross margin model 240, in accord with embodiments of the present invention. As an initial step, a customer account is selected for gross margin analysis (705). For a chosen customer account, customer attributes such as purchase frequency of the customer 261, last purchase time for the customer 262, buying power of the customer 263, and share of wallet of the customer 264 are provided to a logistic regression model (710). The logistic regression model then generates an output reflective of a propensity score P (715) associated with a likelihood of the customer purchasing in the next quarter, where in one embodiment 0<P<1. The propensity score is provided as an input to external factors gross margin model 240. The external gross margin model then adjusts the propensity score in light of customer pipeline data 270, as needed.

The propensity score adjustment process begins by determining if the propensity score is greater than a fixed gross margin threshold (e.g., 0.5) (720). If so, then a gross margin of the customer account's last four quarters consumption is calculated (725). If the propensity score does not meet the gross margin threshold, then a determination is made as to whether a pipeline exists for the customer (730). Customer pipeline information 270 can be provided by the organization's sales force. One example of pipeline information is when a sales opportunity is identified and then logged by the sales organization. The pipeline log information can include details of the opportunity such as the account to whom it is quoted, the sales individual responsible for the opportunity, follow up information related to the opportunity, the quoted dollar amount associated with the opportunity, and a probability of the opportunity being converted into actual sales. This pipeline log information is then used in external gross margin model 242 adjust the customer account propensity score as appropriate.

If a pipeline does not exist for the customer (730), then the customer account is rejected for gross margin determination (735). If a pipeline does exist, then a determination is made as to whether the probability associated with the pipeline is greater than a first threshold (e.g. 90%) (740). If the probability associated with the pipeline is greater than the first threshold, then an adjusted propensity score is generated by adding a first fixed number (e.g. 0.4) to the propensity score (745). If the adjusted propensity score is greater than the gross margin threshold (750), then the customer account gross margin for the last four quarters is calculated (725). This calculated gross margin for the customer account, along with calculated gross margins for other customer accounts, is used in adjusting the overall gross margin calculation, as illustrated in FIG. 2 (280). If the adjusted propensity score is less than the gross margin threshold (750), then the customer account is rejected for gross margin determination (735).

If the probability associated with the pipeline is not greater than the first threshold (740), then a determination is made as to whether the probability associated with the pipeline is greater than a second, lower threshold (760). If the probability associated with the pipeline is greater than the second threshold, then an adjusted propensity score is generated by adding a second fixed number that is lower than the first fixed number to the propensity score (765). If the adjusted propensity score is greater than the gross margin threshold (750), then the customer account gross margin for the last four quarters is calculated (725). If the adjusted propensity score is less than the gross margin threshold (750), then the customer account is rejected for gross margin determination (735).

If the probability associated with the pipeline is not greater than the second threshold (760), then a determination is made as to whether the probability associated with the pipeline is greater than a third, lower threshold (770). If the probability associated with the pipeline is greater than the third threshold, then an adjusted propensity scores generated by adding a third fixed number that is lower than the second fixed number to the propensity score (775). If the adjusted propensity score is greater than the gross margin threshold (750), then the customer account gross margin for the last four quarters is calculated (725). If the adjusted propensity score is less than the gross margin threshold (750), then the customer account is rejected for gross margin determination (735).

Finally, if the probability associated with the pipeline is not greater than the third threshold (770), then the customer account is rejected for gross margin determination (735). It should be noted that embodiments of the present invention are not limited to particular thresholds or particular numbers of thresholds. Differing granularities of adjustment to propensity score can be used as indicated by the facts of a particular sales impact on gross margin scenario.

Through the use of customer attribute data 260 and customer pipeline data 270, as described above, predictions can be made as to whether a customer account is likely to purchase additional product in a next quarter. Once this is determined, the customer's purchase consumption/margin profile is quantified by averaging the last four quarters of that customer's gross margin.

As discussed above, embodiments of the present invention provide a machine learning approach to predict an organization's gross margin before a new quarter begins. This gives the organization an opportunity to take action in order to align profitability to targets. Embodiments also provide key information and recommendations as to how to recover profitability. Further, embodiments can be coupled to reporting and analytics platforms to predict gross margin not only for a particular business unit within an organization, but throughout all business units in the organization. In addition, output from the gross margin determination can be provided to a simulation environment that provides a variety of data which can be adjusted and fed back into the gross margin calculation to determine how the organization can best improve predicted gross margin.

Figure 8:
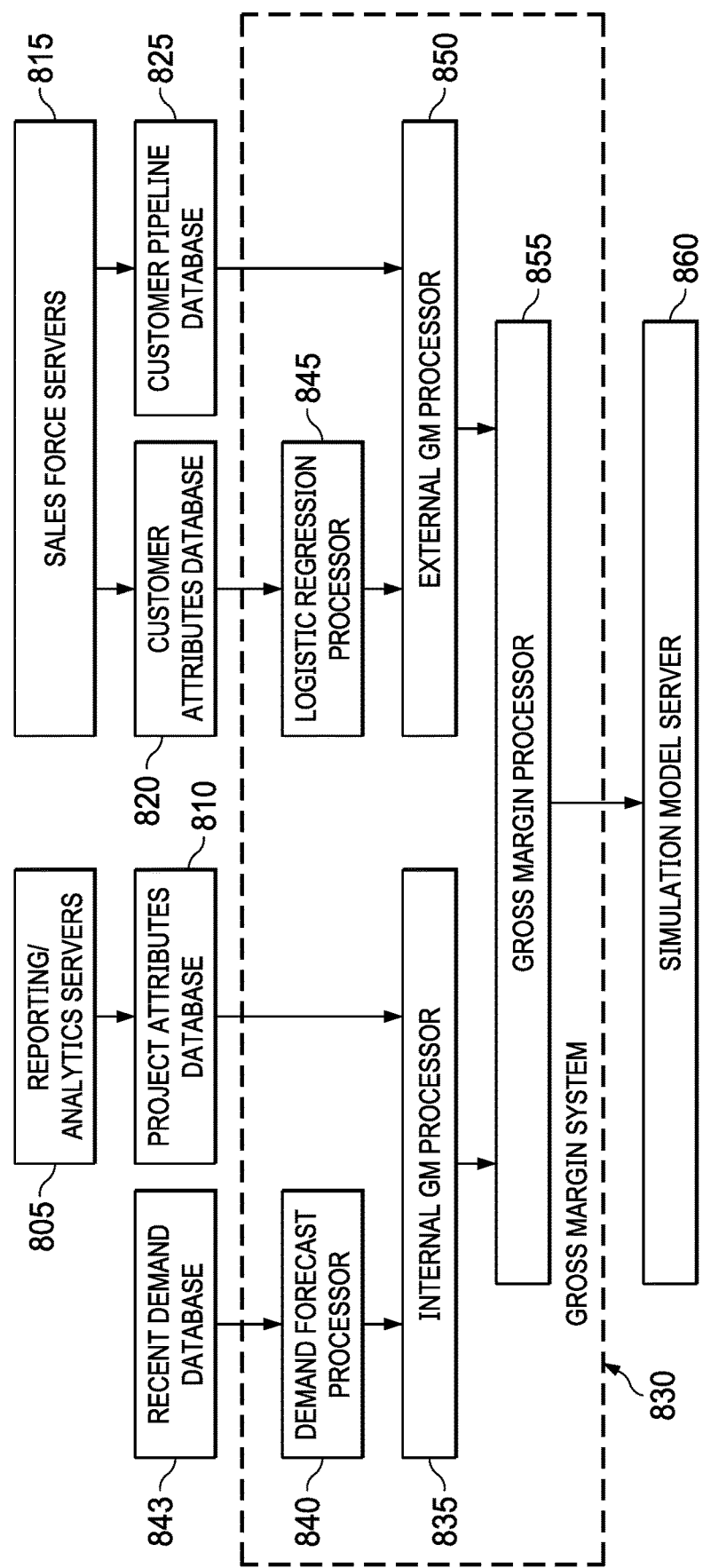
FIG. 8 is a simplified block diagram illustrating a system configured to provide gross margin prediction in accord with embodiments of the present invention.

FIG. 8 is a simplified block diagram illustrating a system configured to provide gross margin prediction in accord with embodiments of the present invention. A reporting/analytics server 805 provides product attributes information to a product attributes database 810. Sales force servers 815 are used by the sales team to track customer purchase information, such as frequency- and recency-related information, and store the information in customer attributes database 820. In addition, the sales force servers can provide information regarding customer pipeline information (e.g., opportunities) to customer pipeline database 825 for storage.

Product attributes database provides the product attributes information to an internal gross margin processor 835 of a gross margin system 830, as discussed above. The internal gross margin processor also receives information from demand forecast model 840, which generates a demand forecast for the next quarter using data provided by a recent demand database 843, as also discussed above. Internal gross margin processor 835 executes the internal gross margin model calculations discussed above.

Customer attributes information is provided by customer attributes database 820 to a logistic regression processor 845 that is part of gross margin system 830. Logistic regression processor 845 executes the logistic regression model discussed above to generate propensity scores for selected customers. The propensity score information is provided to an external gross margin processor 850, along with customer pipeline information from customer pipeline database 825. External gross margin processor 850 executes the external gross margin model calculations to generate gross margins for the selected customer accounts, as discussed above.

The internal and external gross margin information generated by internal gross margin processor 835 and external gross margin processor 850 is provided to a gross margin processor 855 that combines the information and generates an estimated gross margin for the upcoming quarter. This estimated gross margin is provided to a simulation model server 860 that displays the information and allows an analyst to modify various pricing levers (e.g., total cost per unit, total list price revenue per unit, total revenue per unit, and share of wallet) to determine effect on the estimated gross margin. Simulation model results can be fed back into the system for additional gross margin calculations (e.g, as an input to internal gross margin processor 835).

Gross margin system 830, along with the reporting/analytics servers 805 and sales force servers 815 are examples of information handling systems used by embodiments of the present invention. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 9:
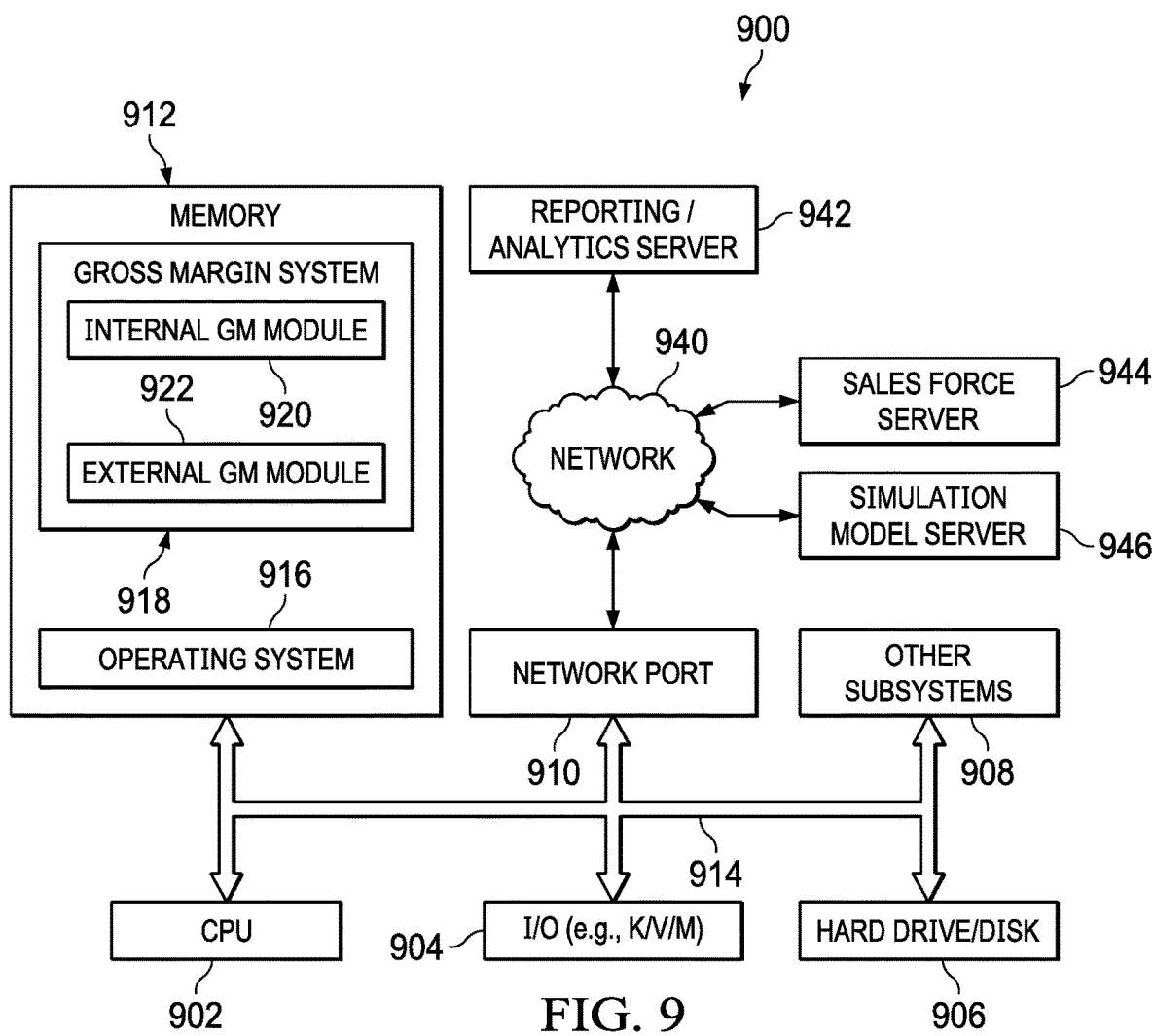
FIG. 9 shows a general illustration of components of an information handling system as implemented in the system and method of the present invention.

FIG. 9 is a generalized illustration of an information handling system 900 that can be used to implement the system and method of the present invention. The information handling system 900 includes a processor (e.g., central processor unit or "CPU") 902, input/output (I/O) devices 904, such as a display, a keyboard, a mouse, and associated controllers, a hard drive or disk storage 906, and various other subsystems 908. In various embodiments, the information handling system 900 also includes network port 910 operable to connect to a network 940, which is likewise accessible by a reporting analytics server 943, sales force server 944, and simulation model server 946. The information handling system 900 likewise includes system memory 912, which is interconnected to the foregoing via one or more buses 914. System memory 912 further comprises operating system (OS) 916 and in various embodiments may also comprise gross margin system 918.

Gross margin system module 918 performs the tasks described above with regard to predicting gross margin in light of the internal and external data using internal gross margin module 920 and external gross margin module 922, respectively.

As will be appreciated, once information handling system 900 is configured to perform the gross margin predictions operation, the information handling system 900 becomes a specialized computing device specifically configured to perform the gross margin predictions operation and is not a general purpose computing device. Moreover, the implementation of the gross margin predictions operation on the information handling system 900 improves the functionality of the information handling system and provides a useful and concrete result of a more accurate set of gross margin predictions for the organization through the use of not only internal product information but also external customer-driven information.

As will be appreciated by one skilled in the art, the present invention may be embodied as a method, system, or computer program product. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations or block diagrams of methods, systems apparatus, and computer program products according to embodiments of the invention. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and acts specified in the flowchart or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function or act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for generating a predicted gross margin for an organization, the method comprising:
   generating an internal factors gross margin prediction using one or more product attributes;
   generating an external factors gross margin prediction using one or more customer attributes and customer sales pipeline information;
   training a plurality of demand forecast models using a training dataset, the training dataset comprising product demand data across a plurality of periods of time, the product demand data across the plurality of periods of time allowing the plurality of demand forecast models to be trained to generate respective forecasted demand;
   selecting a demand forecast model from the plurality of demand forecast models based upon the respective forecasted demand generated using the product demand dataset, the demand forecast model providing a best mean average percent error (MAPE); and,
   generating the predicted gross margin for the organization using the demand forecast model, the demand forecast model the internal factors gross margin prediction and the external factors gross margin prediction;
   and wherein,
   the generating the internal factors is performed by an internal gross margin processor of a gross margin system, generating the external factors is performed by an external gross margin processor of the gross margin system and generating the predicted gross margins is performed by a gross margin processor of the gross margin system, the gross margin system is specifically configured to perform a gross margin predictions operation; and,
   the generating the internal factors, generating the external factors and generating the predicted gross margins are performed via a supervised machine learning operation, the supervised machine learning operation using internal parameters and external parameters when generating the predicted gross margin for the organization using the demand forecast model.

2. The method of claim 1 wherein the one or more product attributes comprise one or more of average list price per unit, average cost per unit, average discount per unit, run rate revenue, and routes to market revenue.

3. The method of claim 1 wherein generating the internal factors gross margin prediction further comprises:
   forecasting demand for one or more products using one or more forecast models.

4. The method of claim 3 wherein said generating the internal factors gross margin prediction further comprises using a linear regression model to combine information from the one or more forecast models and the one or more product attributes.

5. The method of claim 3, wherein the one or more forecast models comprise one or more of an autoregressive integrated moving average model, a triple exponential smoothing model, and an additive model comprising a saturation growth model and a piecewise linear model.

6. The method of claim 5 wherein said using the one or more forecast models comprises selecting a best fit forecast model for recent demand data.

7. The method of claim 1 wherein the one or more customer attributes comprise one or more of purchase frequency associated with a customer account, last purchase time associated with the customer account, buying power associated with the customer account, and share of wallet associated with the customer account.

8. The method of claim 1 wherein said generating the external factors gross margin prediction using one or more customer attributes and customer sales pipeline information further comprises:
   generating a propensity score for a selected customer account;
   calculating a customer account gross margin for a set period if the propensity score is greater than a gross margin threshold;
   adjusting the propensity score in light of the customer sales pipeline information associated with the selected customer account, if the propensity score is less than the gross margin threshold; and
   calculating the customer account gross margin for the set period if the adjusted propensity score is greater than the gross margin threshold.

9. The method of claim 8 wherein said generating the propensity score comprises using a logistic regression model on the customer attributes for the selected customer account.

10. The method of claim 9 wherein said adjusting the propensity score comprises:
    rejecting the customer account for gross margin determination if one of no pipeline exists for the customer account or a pipeline probability associated with the pipeline sales information is less than a first threshold; and
    adjusting the propensity score by a first amount if the pipeline sales information is greater than the first threshold.

11. The method of claim 9 wherein said adjusting the propensity score further comprises:
    adjusting the propensity score by a second amount if the pipeline sales information is greater than a second threshold, wherein the second threshold is greater than the first threshold and the second amount is greater than the first amount; and
    adjusting the propensity score by a third amount if the pipeline sales information is greater than a third threshold, wherein the third threshold is greater than the second threshold and the third amount is greater than the second amount.

12. A specialized computing device comprising:
    a processor;
    a data bus coupled to the processor; and
    a non-transitory, computer-readable storage medium coupled to the data bus, and storing computer program code, wherein the computer program code interacts with a plurality of computer operations and comprises instructions executable by the processor such that the processor is configured to:
    generate an internal factors gross margin prediction using one or more product attributes;
    generate an external factors gross margin prediction using one or more customer attributes and customer sales pipeline information;
    train a plurality of demand forecast models using a training dataset, the training dataset comprising product demand data across a plurality of periods of time, the product demand data across the plurality of periods of time allowing the plurality of demand forecast models to be trained to generate respective forecasted demand;

select a demand forecast model from the plurality of demand forecast models based upon the respective forecasted demand generated using the product demand dataset, the demand forecast model providing a best mean average percent error (MAPE); and, generate the predicted gross margin for the organization using the demand forecast model, the demand forecast model the internal factors gross margin prediction and the external factors gross margin prediction; and wherein the generating the internal factors is performed by an internal gross margin processor of a gross margin system, generating the external factors is performed by an external gross margin processor of the gross margin system and generating the predicted gross margins is performed by a gross margin processor of the gross margin system, the gross margin system is specifically configured to perform a gross margin predictions operation; and, the generating the internal factors, generating the external factors and generating the predicted gross margins are performed via a supervised machine learning operation, the supervised machine learning operation using internal parameters and external parameters when generating the predicted gross margin for the organization using the demand forecast model.

13. The specialized computing device of claim 12, wherein the processor is configured to generate the internal factors gross margin prediction by being further configured to forecast demand for one or more products using one or more forecast models.

14. The specialized computing device of claim 13, wherein the processor is configured to generate the internal factors gross margin prediction by being further configured to use a linear regression model to combine information from the one or more forecast models and the one or more product attributes.

15. The specialized computing device of claim 13, wherein the one or more forecast models comprise one or more of an autoregressive integrated moving average model, a triple exponential smoothing model, and an additive model comprising a saturation growth model and a piecewise linear model.

16. The specialized computing device of claim 13, wherein the processor is configured to use the one or more forecast models by being further configured to select a best fit forecast model for recent demand data.

17. The specialized computing device of claim 12, wherein the processor is configured to generate the external factors gross margin prediction using one or more customer attributes and customer sales pipeline information by being further configured to:

generate a propensity score for a selected customer account;

calculate a customer account gross margin for a set period if the propensity score is greater than a gross margin threshold;

adjust the propensity score in light of the customer sales pipeline information associated with the selected customer account, if the propensity score is less than the gross margin threshold; and calculate the customer account gross margin for the set period if the adjusted propensity score is greater than the gross margin threshold.

18. The specialized computing device of claim 17, wherein the processor is configured to generate the propensity score by being further configured to use a logistic regression model on the customer attributes for the selected customer account.

19. The specialized computing device of claim 18, wherein the processor is configured to adjust the propensity score by being further configured to:

reject the customer account for gross margin determination if one of no pipeline exists for the customer account or a pipeline probability associated with the pipeline sales information is less than a first threshold; and adjust the propensity score by a first amount if the pipeline sales information is greater than the first threshold.

20. A non-transitory, computer-readable storage medium embodying computer program code, the computer program code comprising computer executable instructions configured for:

generating an internal factors gross margin prediction using one or more product attributes;

generating an external factors gross margin prediction using one or more customer attributes and customer sales pipeline information;

training a plurality of demand forecast models using a training dataset, the training dataset comprising product demand data across a plurality of periods of time, the product demand data across the plurality of periods of time allowing the plurality of demand forecast models to be trained to generate respective forecasted demand;

selecting a demand forecast model from the plurality of demand forecast models based upon the respective forecasted demand generated using the product demand dataset, the demand forecast model providing a best mean average percent error (MAPE); and, generating the predicted gross margin for the organization using the demand forecast model, the demand forecast model the internal factors gross margin prediction and the external factors gross margin prediction; and wherein the generating the internal factors is performed by an internal gross margin processor of a gross margin system, generating the external factors is performed by an external gross margin processor of the gross margin system and generating the predicted gross margins is performed by a gross margin processor of the gross margin system, the gross margin system is specifically configured to perform a gross margin predictions operation; and, the generating the internal factors, generating the external factors and generating the predicted gross margins are performed via a supervised machine learning operation, the supervised machine learning operation using internal parameters and external parameters when generating the predicted gross margin for the organization using the demand forecast model.

* * * * *